US012475874B2

(12) United States Patent
Von Elling

(10) Patent No.: US 12,475,874 B2
(45) Date of Patent: Nov. 18, 2025

(54) NOISE REDUCTION SYSTEM HAVING A NONLINEARITY FILTER UNIT, METHOD OF OPERATING THE SYSTEM AND USE OF THE SYSTEM

(71) Applicant: recalm GmbH, Hamburg (DE)

(72) Inventor: Marc Von Elling, Hamburg (DE)

(73) Assignee: recalm GmbH, Hamburg (DE)

( * ) Notice: Subject to any disclaimer, the term of this patent is extended or adjusted under 35 U.S.C. 154(b) by 190 days.

(21) Appl. No.: 18/220,968

(22) Filed: Jul. 12, 2023

(65) Prior Publication Data

US 2024/0029701 A1 Jan. 25, 2024

(30) Foreign Application Priority Data

Jul. 19, 2022 (DE) ..................... 10 2022 118 015.8

(51) Int. Cl.
*G10K 11/178* (2006.01)

(52) U.S. Cl.
CPC .. *G10K 11/17815* (2018.01); *G10K 11/17823* (2018.01); *G10K 11/17825* (2018.01); *G10K 11/17881* (2018.01); *G10K 2210/1282* (2013.01); *G10K 2210/3012* (2013.01); *G10K 2210/30231* (2013.01); *G10K 2210/3026* (2013.01); *G10K 2210/3027* (2013.01); *G10K 2210/3028* (2013.01); *G10K 2210/3035* (2013.01); *G10K 2210/3044* (2013.01);
(Continued)

(58) Field of Classification Search
CPC ....... G10K 11/17815; G10K 11/17823; G10K 11/17825; G10K 11/17881; G10K 2210/1282; G10K 2210/3012; G10K 2210/30231; G10K 2210/3026; G10K 2210/3027; G10K 2210/3028; G10K 2210/3035; G10K 2210/3044; G10K 2210/3046; G10K 2210/3055
USPC ........................................................ 381/71.4
See application file for complete search history.

(56) References Cited

U.S. PATENT DOCUMENTS 5,381,485 A 1/1995 Elliott
2006/0133620 A1 * 6/2006 Lashkari ................. H04R 3/04
381/59

(Continued)

FOREIGN PATENT DOCUMENTS

DE 41 11 884 A1 10/1992
DE 43 34 040 A1 4/1995

(Continued)

*Primary Examiner* — Vivian C Chin
*Assistant Examiner* — Douglas J Suthers
(74) *Attorney, Agent, or Firm* — Scully, Scott, Murphy & Presser, P.C.

(57) ABSTRACT

A noise reduction system for actively compensating background noise in a passenger transport area of a vehicle. The noise reduction system includes a nonlinearity filter unit having a model of a non-linear transfer function of the sound generator, wherein the nonlinearity filter unit is configured to receive the anti-noise signal and to generate a filtered anti-noise signal by applying a non-linear filter function on the anti-noise signal, which is based on the model of the non-linear transfer function in that the non-linear response of the sound generator is at least partially corrected when driven by the filtered anti-noise signal. Wherein the nonlinearity filter unit is further configured to output the filtered anti-noise signal to a sound generator.

17 Claims, 7 Drawing Sheets

8 Sensor
10 Control unit
12 Sound generator
14a Noise reduction area
14b Noise reduction area
15 Monitor microphones
16 Monitor-microphone array
20 Noise reduction system
22 Seat
24 Headrest
26 Head tracking system
28 Stereo cameras
30 Head
32 Virtual microphones
46 Position detection unit

(52) U.S. Cl.
CPC ................ *G10K 2210/3046* (2013.01); *G10K 2210/3055* (2013.01)

(56) References Cited

U.S. PATENT DOCUMENTS

| | | | | |
|---|---|---|---|---|
| 2010/0092004 | A1 | 4/2010 | Kuze | |
| 2013/0163774 | A1 | 6/2013 | Maeda | |
| 2015/0172813 | A1 | 6/2015 | Goto et al. | |
| 2019/0051283 | A1* | 2/2019 | Malka .................. | G10K 11/178 |
| 2021/0323562 | A1 | 10/2021 | You et al. | |

FOREIGN PATENT DOCUMENTS

| | | | |
|---|---|---|---|
| DE | 10 2019 123 971 | A1 | 3/2021 |
| EP | 3 435 372 | A1 | 1/2019 |
| JP | H07-114391 | A | 5/1995 |
| WO | 2020/047286 | A1 | 3/2020 |
| WO | 2021/250237 | A1 | 12/2021 |

* cited by examiner

2 Vehicle
4 Passenger transport area
6 Noise source
8 Sensor
10 Control unit
12 Sound generator
14 Noise reduction area
16 Monitor-microphone array 8 Sensor
10 Control unit
12 Sound generator
14a Noise reduction area
14b Noise reduction area
15 Monitor microphones
16 Monitor-microphone array
20 Noise reduction system
22 Seat
24 Headrest
26 Head tracking system
28 Stereo cameras
30 Head
32 Virtual microphones
46 Position detection unit 8 Sensor; 10 Control unit; 12 Sound generator; 15 Monitor microphones; 16 Monitor-microphone array; 30 Head; 34 Anti-noise unit; 36 Dynamic adjustment unit; 38 First filter unit; 39 First arithmetic unit; 40 Second filter unit; 41 Third filter unit; 42 Second arithmetic unit; 44 Averaging unit 50 Band pass unit; 60 Nonlinearity filter unit 8 Sensor; 10 Control unit; 12 Sound generator; 15 Monitor microphones; 16 Monitor-microphone array; 30 Head; 34 Anti-noise unit; 36 Dynamic adjustment unit; 38 First filter unit; 39 First arithmetic unit; 40 Second filter unit; 41 Third filter unit; 42 Second arithmetic unit; 44 Averaging unit 50 Band pass unit; 60 Nonlinearity filter unit 8 Sensor; 10 Control unit; 12 Sound generator; 15 Monitor microphones; 16 Monitor-microphone array; 30 Head; 34 Anti-noise unit; 36 Dynamic adjustment unit; 38 First filter unit; 39 First arithmetic unit; 40 Second filter unit; 41 Third filter unit; 42 Second arithmetic unit; 44 Averaging unit; 48 Direct monitor microphone; 50 Band pass unit; 60 Nonlinearity filter unit 8 Sensor; 10 Control unit; 12 Sound generator; 15 Monitor microphones; 16 Monitor-microphone array; 30 Head; 34 Anti-noise unit; 36 Dynamic adjustment unit; 38 First filter unit; 39 First arithmetic unit; 40 Second filter unit; 41 Third filter unit; 42 Second arithmetic unit; 44 Averaging unit; 48 Direct monitor microphone; 50 Band pass unit; 60 Nonlinearity filter unit 8 Sensor; 10 Control unit; 12 Sound generator; 15 Monitor microphones; 16 Monitor-microphone array; 30 Head; 34 Anti-noise unit; 36 Dynamic adjustment unit; 38 First filter unit; 39 First arithmetic unit; 40 Second filter unit; 41 Third filter unit; 42 Second arithmetic unit; 44 Averaging unit; 48 Direct monitor microphone; 50 Band pass unit; 60 Nonlinearity filter unit

NOISE REDUCTION SYSTEM HAVING A NONLINEARITY FILTER UNIT, METHOD OF OPERATING THE SYSTEM AND USE OF THE SYSTEM

CROSS-REFERENCE TO RELATED APPLICATION

The present application is based upon and claims the benefit of priority from DE 10 2022 118 015.8 filed on Jul. 19, 2022, the entire contents of which is incorporated herein by reference.

BACKGROUND

Field

The present disclosure relates to a noise reduction system and more particularly to a noise reduction system for actively compensating background noise generated by a noise source in a noise reduction area in a passenger transport area of a vehicle The present disclosure also relates to the use of the system.

Furthermore, the present disclosure relates to a method of operating a noise reduction system for actively compensating background noise generated by a noise source in a noise reduction area in a passenger transport area of a vehicle.

Prior Art

Noise reduction systems are known in various configurations. Noise reduction systems are also referred to as noise suppression systems, background noise suppression systems, background noise reduction systems and noise-canceling systems. A distinction is made between active and passive systems. In case of a passive system, sound-absorption materials are applied in order to reduce the undesired background noise in for example a passenger area of a vehicle. In active noise reduction systems, which are also referred to as active noise-canceling systems or active noise control systems (often abbreviated as "ANC"), active noise compensation by means of anti-noise (also referred to as "counter noise") is applied. The anti-noise is superimposed on the undesired background noise in that the background noise is reduced or almost completely eliminated in a quiet zone by means of destructive interference.

In the context of this disclosure, only active noise reduction systems are explained, even if these are not explicitly referred to as active noise reduction systems but rather merely as noise reduction systems.

In noise reduction systems, efficient suppression of the background noise can only be achieved within a small spatial region. This spatial region is typically referred to as a quiet zone and lies inside a noise reduction area of the system. In the quiet zone, the anti-noise is superimposed on the background noise in more or less exact phase opposition. Therefore, efficient suppression of the background noise occurs. This spatial limitation leads to the effect that active noise reduction systems are rather sensitive to movements of the head of a user. When the entrance of the auditory channel at the ear of the user is no longer located in the quiet zone, efficient background noise reduction cannot be guaranteed and the noise reduction system loses effectiveness.

This is why a relocation or readjustment of the noise reduction area is performed in many cases. Generally, noise reduction systems are driven by minimizing an error signal, which indicates the residual noise not canceled by the noise reduction system. To provide efficient noise-canceling, the residual noise near or at the auditory channel of the ear of the user should be minimized. To estimate said noise at a position in which no physical microphone can be placed or is not desired to be placed, the concept of "virtual microphones" has been established. This concept is basically described for example in U.S. Pat. No. 5,381,485.

When referring back to the movement of the user's head, the adaption of the noise reduction system to said movement is performed by relocating a position of the virtual microphone, which is configured to pick up the sum of the background noise and the anti-noise.

In many cases, a microphone array is applied for picking up a signal used for subsequent estimation of the signal at the position of the virtual microphone. There are various approaches applying different filters that are used to estimate a residual signal representing the sum of the background noise and the anti-noise at a position of the virtual microphone.

Furthermore, an active noise reduction system comprises a microphone for detecting the background noise of a noise source, the noise of which should be eliminated in the noise reduction area. This microphone is often referred to as a reference microphone. An anti-noise filter driving a sound generator that emits the anti-noise uses the signal of the reference microphone. The output of the anti-noise filter is not only used for driving the sound generator but is also input to a further filter. This is configured to estimate a muting signal representing the anti-noise at the position of the before mentioned virtual microphone. By subtracting the estimated muting signal from the estimated signal, which is the background noise and the anti-noise, an error signal can be derived. This error signal represents a cost function of the noise reduction system. By minimizing the value of the error function, the noise-canceling system is dynamically adapted to the noise generated by the noise source and by that, efficient noise reduction at the position of the virtual microphone can be achieved.

The position of the virtual microphone does however not match in all situations with the location of the auditory channel of the user's ear. In an attempt to provide a flexible and dynamic noise reduction in a noise reduction area, a plurality of virtual microphones can be established. A virtual microphone can be selected for active noise reduction, wherein a selection of the virtual microphone being located next to the detected location of the user's ear will provide the most efficient noise cancelation. Systems using a plurality of virtual microphone positions are for example known from EP 3 435 372 A1 or from WO 2020/047286 A1.

Irrespective of the particular implementation of the noise reduction system, it was observed that the systems sometimes suffer from instabilities under varying operating conditions.

SUMMARY

It is an object to provide a noise reduction system for actively compensating background noise, a method of operating such a system and use of said system, wherein efficient and stable noise reduction in a noise reduction area should be provided.

Such object can be solved by a noise reduction system for actively compensating background noise generated by a noise source in a noise reduction area in a passenger transport area of a vehicle, the system comprising a controller comprising hardware, a reference sensor for detecting the background noise of the noise source, a sound generator for generating anti-noise for superimposing the anti-noise with the background noise in the noise reduction area for active reduction of the background noise, and a monitor-microphone array having a plurality of monitor microphones, the monitor-microphone array being disposed adjacent to the noise reduction area and being configured to pick up background noise emitted by the noise source and anti-noise emitted by the sound generator, wherein a virtual sensing algorithm is implemented in the controller, which is thereby configured to estimate an error signal at a position of a virtual microphone, wherein the virtual microphone is located in the noise reduction area and the error signal is indicative of a difference between the background noise and the anti-noise at the position of the virtual microphone, the controller further comprising an anti-noise unit for generating an anti-noise signal for driving the sound generator in that it generates the anti-noise, the system is further enhanced by a nonlinearity filter unit having a model of a non-linear transfer function of the sound generator, wherein the filter unit is configured to receive the anti-noise signal and to generate a corrected anti-noise signal by applying a nonlinear filter function on the anti-noise signal, which is based on the model of the non-linear transfer function in that the non-linear response of the sound generator is at least partially corrected when driven by the corrected anti-noise signal, wherein the nonlinearity filter unit is further configured to output the corrected anti-noise signal to the sound generator.

The noise reduction system can provide enhanced stability. Nonlinear harmonics of the sound generator, which can be for example a loudspeaker or another electromagnetic actuator, result in undesired disturbances in the generated anti-noise signal and by that also in the estimated error signal. Typically applied linear filters are not capable of taking into account the nonlinear behavior of the sound generator. As a result of this, the noise-canceling algorithm attempts to compensate for frequencies that are generated due to the nonlinear effects in the sound generator. This, however, sometimes fails when applying prior art approaches and therefore, the traditional noise-canceling can become unstable. By combining the compensation for the nonlinear behavior of the sound generator with the concept of virtual microphones, the noise-canceling can be both, very efficient and very stable.

Compensation of the nonlinear effects in sound generators, such as for loudspeakers, is generally known from, for example DE 43 34 040 A1 or DE 41 11 884 A1. Nonlinearities in electromechanical and electro acoustical transducers basically occur when large output signals are desired and the transducer is urged to operate at large amplitudes. While most transducers, for example loudspeakers, operate with linear response at small amplitudes, for higher amplitudes, nonlinear effects come into play. The nonlinearity filter unit can compensate for this effect. The parameters for the nonlinearity filter unit can be derived for example from a test measurement of the sound generator or from simulations.

It was found that the combination of the concept of virtual microphones together with the compensation of nonlinear effects of the sound generator can be very advantageous. It could be found that the nonlinearities of the sound generator sometimes mislead the noise-canceling algorithm. This can result in instabilities of the noise-canceling algorithm, which cannot be overcome by optimizing of the noise-canceling algorithm itself. It was therefore necessary to take a completely different approach, namely the compensation of the non-linear behavior of the sound generator, to stabilize the noise-canceling algorithm. This unconventional and counterintuitive approach surprisingly resulted in the desired effect.

According to an embodiment, the noise reduction system can be further enhanced in that the sound generator is an electromechanical device and the model of the non-linear transfer function is an adaptive model being configured to adapt on a change in at least one mechanical parameter of the sound generator.

The sound generator can be for example a loudspeaker or another electromagnetic actuator. The noise-canceling system and thereby the sound generator are exposed to varying environmental conditions, when installed in a vehicle. Varying environmental conditions are for example varying humidity and/or temperature. These influence the response behavior of the sound generator, because the mechanical parts thereof change their physical properties with varying temperature, for example. By compensating for these effects, the noise-canceling system can be reliably operated even under different and harsh environmental conditions.

According to an embodiment, the controller can further comprise an averaging unit, which can be configured to calculate an average error signal, which is indicative of a difference between the background noise and the anti-noise at more than one position in the noise reduction area and a dynamic adjustment unit, which is configured to update parameters of the anti-noise unit based on the average error signal and so as to minimize the average error signal.

By averaging the error signals, wherein an average of two or more virtual microphones is taken into account, the quiet zone can be significantly increased. At the same time, the computational load can be reduced to a level, which is similar to systems using only a single virtual microphone. This can represent a significant advantage for practical implementation of the system.

According to an embodiment, the virtual sensing algorithm in the controller can be implemented according to the remote microphone technique. This can be advantageous in practical experiments because it provides the best performance under the desired circumstances.

According to further embodiments, the virtual sensing algorithm can be implemented by other means. For example, the controller can comprise a virtual sensing algorithm which is a virtual microphone arrangement, a forward difference prediction technique, an adaptive LMS virtual microphone technique, a Kalman filtering virtual sensing algorithm or a stochastically optimal tonal diffuse field virtual sensing technique. One of these algorithms can be implemented in the control unit according to further embodiments. Without prejudice, in the following description, further reference will be made to the embodiment in which the remote microphone technique is implemented.

The virtual microphones in the noise reduction area can be arranged in a grid or the position of the virtual microphones can be freely selected and defined. It is also possible to dynamically rearrange the virtual microphones, which means that their positions can be changed or optimized during operation of the system. There is multiplicity of predetermined positions, at which the virtual microphones can be placed.

A plurality of positions can be located in the noise reduction area and the controller can be configured to estimate at least a first error signal for a virtual microphone located at a first position and a second error signal for a virtual microphone located at a second position and the averaging unit can be configured to calculate the average error signal from at least the first and the second error signal.

Averaging of the error signal can be for example performed in that the averaging unit can be further configured to calculate the average error signal, which is an arithmetic average of the at least first and second error signal.

According to another embodiment, the noise reduction system can comprise the feature according to which the averaging unit can be further configured to calculate an average error signal, which can be a weighted average of the at least first and second error signal. Calculating a weighted average of the error signals can allow focus on one or more positions in the noise reduction area. This can be performed by overemphasizing the respective virtual microphone. The emphasis can be put on a single virtual microphone or one more than one microphone, depending on whether particular emphasis should be put on one or on more than a single position. This can result in a shift of the quiet zone to a certain area or to certain areas, while the overall area of the quit zone can be increased. The emphasis can be put on said virtual microphone by overweighting the signal of this microphone in the calculation of the weighted average. For example, the signal can be multiplied by a factor greater than one, which defines the overweight, while the remaining signals are considered without a factor, when calculating the weighted average.

The noise reduction system, according to a further embodiment, can comprise a camera arrangement and a position detection unit for detecting a position and/or orientation of a head of a user in the passenger transport area, wherein the controller can be further configured to select a main virtual microphone position of the plurality of positions for the virtual microphones adjacent to an estimated position of an ear of the user, wherein the averaging unit can be configured to overweight the error signal at the main virtual microphone position when calculating the average error signal.

The position detection unit can be configured as a head tracking system. Using this system, the quiet zone can follow the movement of the passenger's head. This can be performed by shifting the position of the virtual microphone, which can be overemphasized in the calculation of the weighted average. If the virtual microphones are arranged in a fixed pattern or grid, the virtual microphone being located nearest to the auditory channel of a user's ear, can be selected as the microphone on which particular emphasis is put. When calculating the weighted average, this particular virtual microphone can be overemphasized.

According to yet another embodiment, the noise reduction system can be further enhanced in that the controller can comprise: a first filter unit configured to receive the anti-noise signal and to estimate a shifted anti-noise signal, which can be indicative of the anti-noise at a physical position of one of the monitor microphones of the monitor-microphone array, a first arithmetic unit configured to receive the shifted anti-noise signal and a monitor signal of the monitor microphone being located at said physical position, wherein the first arithmetic unit can be configured to calculate a residual signal, which can be a difference between the monitor signal and the shifted anti-noise signal at the physical position of the monitor microphone, a second filter unit, which can be configured to receive the residual signal and to estimate a shifted residual signal, which can be the residual signal shifted to the position of the virtual microphone, a third filter unit configured to receive the anti-noise signal and to estimate a shifted anti-noise signal, which can be indicative of the anti-noise at the position of the virtual microphone, a second arithmetic unit configured to receive the shifted residual signal and the shifted anti-noise signal and to estimate the error signal for the position of the virtual microphone by addition of the shifted residual signal and the shifted anti-noise signal.

In particular, the first filter unit, the first arithmetic unit, the second filter unit, the third filter unit and the second arithmetic unit can be configured to calculate and estimate the respective signals for at least the first and the second position, such as for all positions in the noise reduction area.

By taking into account all virtual microphones, which can be located in the noise reduction area, the quiet zone can be maximized. Furthermore, a maximum flexibility with respect to head tracking and weighting during calculation of the average error signal can be provided.

In another embodiment, the averaging unit can be configured to calculate an average error signal, which can be indicative of a difference between the background noise and the anti-noise in a predetermined area of the noise reduction area comprising more than one position.

The averaging unit can be configured to receive a plurality of monitor signals of monitor microphones being located at different physical positions and to estimate an area monitor signal, which can be indicative of a monitor signal captured by the monitor microphones for a predetermined area of the monitor microphones, wherein the controller can comprise: a first filter unit configured to receive the anti-noise signal and to estimate a shifted area anti-noise signal, which can be indicative of the anti-noise in the predetermined area, a first arithmetic unit configured to receive the shifted area anti-noise signal and the area monitor signal, wherein the first arithmetic unit can be configured to calculate an area residual signal, which is a difference between the area monitor signal and the shifted area anti-noise signal, a second filter unit, which can be configured to receive the area residual signal and to estimate a shifted area residual signal, which is the area residual signal shifted to a predetermined virtual area comprising more than one position of a virtual microphone, a third filter unit configured to receive the anti-noise signal and to estimate a shifted area anti-noise signal, which can be indicative of the anti-noise in the predetermined virtual area, and the averaging unit further comprises a second arithmetic unit configured to receive the shifted area residual signal and the shifted area anti-noise signal and to estimate the error signal for the predetermined virtual area as the average error signal, by addition of the shifted area residual signal and the shifted area anti-noise signal.

The area based calculation can reduce the computational load while, at the same time, the quiet zone can be enlarged.

On the other hand, the averaging over the plurality of error values for different positions in the quiet zone can allow a dynamic and flexible adaption of the system, wherein emphasis can be put on various points in the noise reduction area. While the area based calculation can be a more static solution, the average based solution using a plurality of error values can be dynamically adapted on the individual use situation for example in combination with head tracking.

The noise reduction system according to another embodiment can be further enhanced in that the monitor-microphone array can further comprise a direct monitor microphone and the averaging unit can be configured to calculate the average error signal, by further taking into account a direct residual signal of the direct monitor microphone.

The direct signal of the reference microphone can act as a physical support vector for the calculation, which can be based on the estimated signals of the virtual microphones. Although this measure is counterintuitive, it could be found that this measure enhances the robustness of the algorithm. It could further be found that the direct signal of the reference microphone compensates for estimation errors in the signals of the virtual microphones. The algorithm using weighted control can become more robust when compared to traditional solutions.

The first filter unit can be further configured to estimate a shifted direct anti-noise signal, which can be indicative of the anti-noise at a physical position of the direct monitor-microphone, the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone, the second filter unit and the second arithmetic unit can be configured to bypass the direct residual signal and the averaging unit can be further configured to calculate the average error signal, which can be an average of the at least one error signal for a position in the noise reduction area and the direct residual signal.

Furthermore, the averaging unit can be configured to bypass a direct monitor signal of the direct monitor microphone, the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone, the first arithmetic unit can be further configured to receive the shifted direct anti-noise signal and a direct monitor signal of the direct monitor microphone, wherein the first arithmetic unit can be configured to further calculate a direct residual signal, which can be a difference between the direct monitor signal and the shifted direct anti-noise signal at the position of the direct monitor microphone, the second filter unit and the second arithmetic unit can be configured to bypass the direct residual signal and the averaging unit can be further configured to calculate the average error signal, which can be an average of the error signal for the predetermined virtual area and the direct residual signal.

Furthermore, the noise reduction system can be enhanced in that the controller can further comprise at least one band pass unit, which can be configured to apply a band pass filter on the average error signal and/or on a noise signal picked up by the reference sensor for detecting the background noise of the noise source.

The band pass filter can be a band pass for the frequency range between 50 Hz and 600 Hz. Furthermore, it can be a low-pass filter, wherein a cutoff frequency of the low-pass filter can be between 400 Hz and 1000 Hz, such as between 500 Hz and 800 Hz, or such as at least approximately 600 Hz. The upper cutoff frequency can be chosen in that a prefix of the anti-noise signal does not change within the noise reduction area. This prerequisite can provide for the stability of the noise-canceling algorithm. When calculating a spatial distance from a frequency in one of the mentioned ranges, applying the well-known formula by further taking into account the speed of sound, this results in a spatial distance of about 0.2 m. This limit should be a maximum distance for the points at which the virtual microphones are arranged. The same applies for a distance between the point at which the virtual microphone can be arranged, i.e. one of the aforementioned points, and the physical position of the direct microphone.

Such object can be further solved by a method of operating a noise reduction system for actively compensating background noise generated by a noise source in a noise reduction area in a passenger transport area of a vehicle, the system comprising a controller, a reference sensor for detecting the background noise of the noise source, a sound generator for generating anti-noise for superimposing the anti-noise with the background noise in the noise reduction area for active reduction of the background noise, and a monitor-microphone array having a plurality of monitor microphones, the monitor-microphone array being disposed adjacent to the noise reduction area and being configured to pick up background noise emitted by the noise source and anti-noise emitted by the sound generator, wherein a virtual sensing algorithm is implemented in the controller, which thereby estimates an error signal at a position of a virtual microphone, wherein the virtual microphone is located in the noise reduction area and the error signal is indicative of a difference between the background noise and the anti-noise at the position of the virtual microphone, the controller can further comprise an anti-noise unit for generating an anti-noise signal for driving the sound generator in that it generates the anti-noise, wherein the method can be further enhance by a nonlinearity filter unit having a model of a non-linear transfer function of the sound generator, wherein the filter unit receives the anti-noise signal and generates a corrected anti-noise signal by applying a non-linear filter function on the anti-noise signal, which is based on the model of the non-linear transfer function in that the non-linear response of the sound generator is at least partially corrected when driven by the corrected anti-noise signal, wherein the nonlinearity filter unit outputs the corrected anti-noise signal to the sound generator.

In an embodiment, the sound generator can be an electromechanical device and the model of the non-linear transfer function can be an adaptive model which adapts on a change in at least one mechanical parameter of the sound generator.

According to another embodiment, the controller can further comprise an averaging unit, which can calculate an average error signal, which can be indicative of a difference between the background noise and the anti-noise at more than one position in the noise reduction area and a dynamic adjustment unit, which updates parameters of the anti-noise unit based on the average error signal and so as to minimize the average error signal.

Furthermore, the method can be enhanced in that a plurality of positions can be located in the noise reduction area and the controller can estimate at least a first error signal for a virtual microphone located at a first position and a second error signal for a virtual microphone located at a second position and the averaging unit can calculate the average error signal from at least the first and the second error signal.

The averaging unit can further calculate the average error signal, which can be an arithmetic average of the at least first and second error signal.

According to an embodiment, the averaging unit can calculate the average error signal, which can be a weighted average of the at least first and second error signal, wherein the noise reduction system can further comprise a position detection unit which detects a position and/or orientation of a head and estimates a position of an ear of a user in the passenger transport area, wherein the controller can further select a main position of the plurality of positions, which is adjacent to the estimated position of the ear of the user, wherein the averaging unit gives an overweight to the error signal at the main position when calculating the average error signal.

In another embodiment, the controller can comprise: a first filter unit, which receives the anti-noise signal and estimates a shifted anti-noise signal, which can be indicative of the anti-noise at a physical position of one of the monitor microphones of the microphone array, a first arithmetic unit, which can receive the shifted anti-noise signal and a monitor signal of the monitor microphone being located at said physical position, wherein the first arithmetic unit can calculate a residual signal, which can be a difference between the monitor signal and the shifted anti-noise signal at the physical position of the monitor microphone, a second filter unit can receive the residual signal and estimates a shifted residual signal, which can be the residual signal shifted to the position (P) of the virtual microphone, a third filter unit, which can receive the anti-noise signal and estimate a shifted anti-noise signal, which can be indicative of the anti-noise at the position of the virtual microphone, a second arithmetic unit, which can receive the shifted residual signal and the shifted anti-noise signal and estimate the error signal for the position of the virtual microphone by adding the shifted residual signal and the shifted anti-noise signal.

The first filter unit, the first arithmetic unit, the second filter unit, the third filter unit and the second arithmetic unit can calculate and estimate the respective signals for at least the first and the second position, such as for all positions in the noise reduction area.

According to an embodiment, the averaging unit can calculate an average error signal, which can be indicative of a difference between the background noise and the anti-noise in a predetermined area of the noise reduction area comprising more than one position.

The averaging unit can receive a plurality of monitor signals of monitor microphones being located at different physical positions and estimate an area monitor signal, which can be indicative of an error signal captured by the monitor microphones for a predetermined area of the monitor microphones, wherein the controller can comprise: a first filter unit, which can receive the anti-noise signal and estimate a shifted area anti-noise signal, which can be indicative of the anti-noise in the predetermined area, a first arithmetic unit, which can receive the shifted area anti-noise signal and the area monitor signal, wherein the first arithmetic unit calculates an area residual signal, which can be a difference between the area monitor signal and the shifted area anti-noise signal, a second filter unit, which can receive the area residual signal and estimate a shifted area residual signal, which can be the area residual signal shifted to a predetermined virtual area comprising more than one position of a virtual microphone, a third filter unit, which can receive the anti-noise signal and estimate a shifted area anti-noise signal, which can be indicative of the anti-noise in the predetermined virtual area, and the averaging unit can further comprise a second arithmetic unit, which can receive the shifted area residual signal and the shifted area anti-noise signal and estimate the error signal for the predetermined virtual area as the average error signal by adding the shifted area residual signal and the shifted area anti-noise signal.

According to an embodiment, the monitor-microphone array can further comprise a direct monitor microphone and the averaging unit can calculate the average error signal, by further taking into account a direct residual signal of the direct monitor microphone.

The first filter unit can further estimate a shifted direct anti-noise signal, which can be indicative of the anti-noise at a physical position of the direct monitor microphone, the first arithmetic unit can further receive the shifted direct anti-noise signal and a direct monitor signal of the direct monitor microphone, wherein the first arithmetic unit can further calculate a direct residual signal, which can be a difference between the direct monitor signal and the shifted direct anti-noise signal at the position of the direct monitor microphone, the second filter unit and the second arithmetic unit can bypass the direct residual signal and the averaging unit can calculate the average error signal, which can be an average of the at least one error signal for a position in the noise reduction area and the direct residual signal.

Furthermore, the averaging unit can bypass a direct monitor signal of the direct monitor microphone, the first arithmetic unit can further receive the shifted direct anti-noise signal and a direct monitor signal of the direct monitor microphone, wherein the first arithmetic unit can further calculate a direct residual signal, which can be a difference between the direct monitor signal and the shifted direct anti-noise signal at the position of the direct monitor microphone, the first arithmetic unit can further receive the shifted direct anti-noise signal and a direct monitor signal of the direct monitor microphone, wherein the first arithmetic unit can further calculate a direct residual signal, which can be a difference between the direct monitor signal and the shifted direct anti-noise signal at the position of the direct monitor microphone, the second filter unit and the second arithmetic unit can bypass the direct residual signal and the averaging unit can further calculate the average error signal, which can be an average of the error signal for the predetermined virtual area and the direct residual signal.

According to still another embodiment, the controller can further comprise at least one band pass unit, which can apply a band pass filter on the average error signal and/or on a noise signal picked up by the reference sensor for detecting the background noise of the noise source.

Furthermore, the method can be enhanced by actively compensating background noise generated by a noise source in a noise reduction area in a passenger transport area of a vehicle, such as in a commercial vehicle, or in a construction vehicle.

Same or similar advantages and advantageous embodiments which have been mentioned with respect to the noise reduction system apply to the method of operating the noise reduction system in a same or similar way and are therefore not repeated.

Such object can also be solved by use of the noise reduction system according to any of the previously mentioned embodiments. The used noise reduction system is for actively compensating background noise generated by a noise source in a noise reduction area in a passenger transport area of a vehicle. Such vehicle can be a commercial vehicle, or a construction vehicle.

BRIEF DESCRIPTION OF THE DRAWINGS

Further features of the embodiments will become apparent from the description of the embodiments together with the claims and the attached drawings. Embodiments can fulfill individual features or a combination of several features.

The embodiments are described below, without restricting the general idea of the invention, using exemplary embodiments with reference to the drawings, express reference being made to the drawings with regard to all details that are not explained in greater detail in the text. In the drawings.

In the drawings, the same or similar elements and/or parts are provided with the same reference numbers in order to prevent the item from needing to be reintroduced.

DETAILED DESCRIPTION

Figure 1:
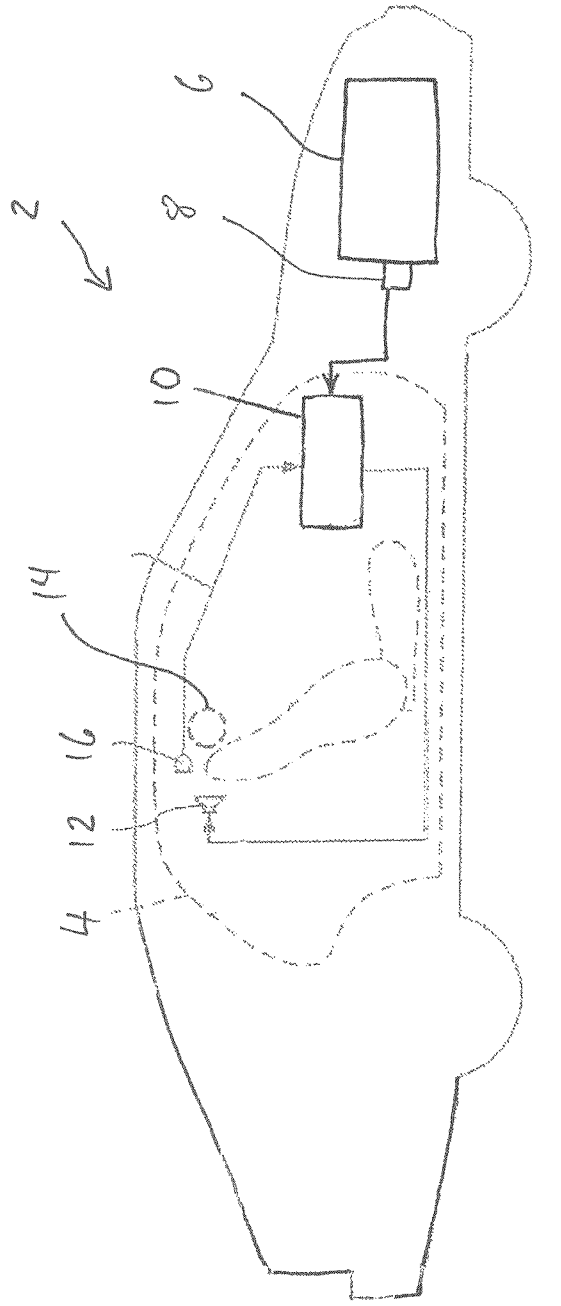
FIG. 1 illustrates a simplified schematic drawing illustrating a vehicle comprising a noise reduction system.

FIG. 1 is a simplified schematic drawing of a vehicle 2, which can be a passenger car, a commercial vehicle, a construction vehicle or any other road driven vehicle. The vehicle 2 comprises a passenger transport area 4, which is illustrated in dashed line. The vehicle 2 is equipped with a noise reduction system for actively compensating background noise, which is generated by a noise source 6. The noise source 6 can be the engine of the vehicle 2 or any other device or source which generates undesired background noise. For example, the noise source 6 can be a wheel, an auxiliary drive or a mechanic or hydraulic system of the vehicle 2. The noise, which is to be reduced in the passenger transport area 4 is measured by a sensor 8. The sensor 8 can be any device suitable for detecting the background noise of the noise source 6. It can be a microphone or an acceleration sensor. The sensor 8 is not limited to an electro acoustical or electromechanical device like a microphone. It is also possible to input a signal related to the background noise source 6 to a model, which outputs a computed background noise signal. For example, a number of revolutions of an engine or any other suitable parameter thereof can be input to the model of the engine or can be directly input to the noise-canceling system. In other words, parameters of the noise source 6, which are electronically available, can be directly used for estimation of the background noise.

The noise reduction system of the vehicle 2 comprises a control unit 10 (such as a processor/controller comprising hardware), which can be a separate electronic device. The control unit 10, however, can also be implemented as software in a main controller of the vehicle 2, which, in this case, provides the control unit 10. The noise reduction system further comprises a sound generator 12 for generating anti-noise. The sound generator 12 can be a loudspeaker. The anti-noise and the background noise are superimposed in a noise reduction area 14 for active reduction of the background noise. Furthermore, the noise reduction system comprises a monitor-microphone array 16, which is disposed adjacent to the noise reduction area 14. The monitor-microphone array 16 is configured to pick up background noise emitted by the noise source 6 and anti-noise emitted by the sound generator 12.

Figure 2:
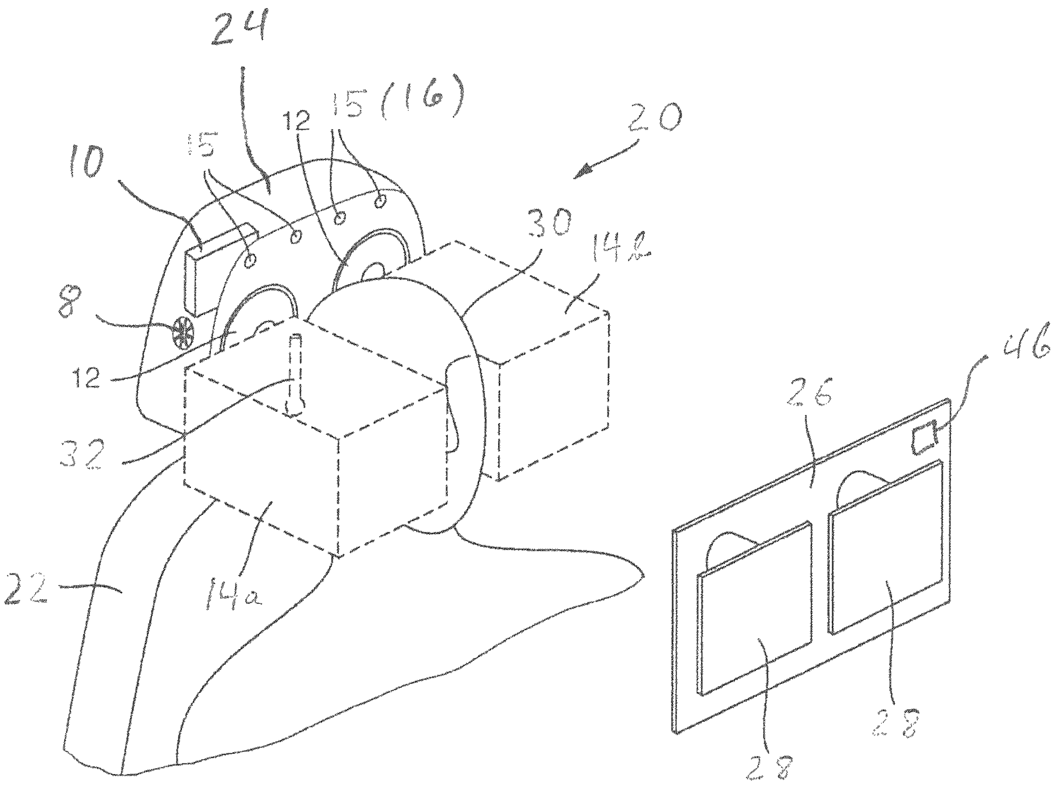
FIG. 2 illustrates a simplified schematic illustration of a noise reduction system and FIGS. 3 to 7 illustrate a functionality of a noise reduction system according to various embodiments.
Figure 2:
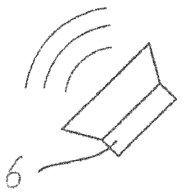

FIG. 2 shows a simplified schematic illustration of the noise reduction system 20, which can be integrated in the vehicle 2 shown in FIG. 1. By way of an example, the main parts of the system are arranged in a driver's seat 22, such as in a headrest 24 of the seat 22.

There is the control unit 10, a plurality of monitor microphones 15 forming the monitor-microphone array 16 and the sound generator 12. Furthermore, a sensor 8, for example a microphone, can be arranged in the headrest 24 for detecting the background noise of the noise source 6 (schematically represented by a loudspeaker). The senor 8 can also be arranged remote from the remaining parts of the system 20 as it is for example illustrated in FIG. 1. The noise reduction system 20 in FIG. 2 is a compact system, which can be completely implemented in one single unit, by way of an example in the headrest 24. In a more distributed system, it is also possible that the noise-canceling system 20 uses existing sensors, which are already present in the vehicle 2 and are used by other systems of the vehicle 2, for example by an audio system.

The noise reduction system 20 can be used with or without the sensor 8. The presence of the sensor 8 depends on whether the noise reduction system 20 is a feed forward system (with the reference sensor 8) or a feedback system (without the reference sensor 8). If the system 20 dispenses with the sensor 8, the background noise is directly detected using the monitor microphone array 16. Furthermore, the noise reduction system 20 comprises a sound generator 12, which is for example a loudspeaker. The sound generator 12 is also located in the headrest 24 by way of an example only.

The noise reduction system 20 further comprises a head tracking system 26, which comprises for example a pair of stereo cameras 28. The head tracking system 26 is applied for detecting a position and/or orientation of the head 30 of a passenger, who is situated in the passenger transport area 4. The head tracking system 26 is suitable for detecting the position of an ear of the user, such as the location of the entrance of the auditory channel. The head tracking system 26 can also be integrated in the headrest 24 so as to provide an integrated system. The position of the user's head 30 is detected or computed by the position detection unit 46 of the head tracking system 26.

The head tracking is suitable for establishing the noise reduction area 14 in that it is directly adjacent to the passenger's head 30, i.e. near to the passenger's ears. When making reference to a noise reduction area 14, it should be noted that there is a right noise reduction area 14*b* and a left noise reduction area 14*a*, which are established so as to provide a suitable noise reduction for both ears of the user. By way of an example and without limitation, for the purpose of simplification of explanations only, reference will be made to a noise reduction area 14 in the following. Notwithstanding the explanations are made for a single noise reduction area 14, the noise reduction system 20 is suitable for establishing two or even more noise reduction areas 14 for at least both ears of a passenger or even for a plurality of passengers.

In an attempt to establish the noise reduction area 14 at the most suitable position for efficient noise reduction, the noise reduction system 20 applies the concept of virtual microphones 32. The virtual microphone 32 is established in the noise reduction area 14. At a position of the virtual microphone 32, an error function is detected, which is the residual noise at the position of the virtual microphone 32 after noise cancelation. By minimizing the error function at the position of the virtual microphone 32, the noise reduction system 20 optimizes noise-canceling performance. This is why it is desirable to place the virtual microphone 32 as near to the entrance of the auditory channel of the passenger's head 30 as possible. This can be performed by for example relocating the position of the virtual microphone 32 based on data generated by the head tracking system 26.

The control unit 10 runs a virtual sensing algorithm which is commonly referred to as the "remote microphone technique". Without prejudice, reference will be made to this type of algorithm in the following. According to further embodiments, alternative algorithms can be run on the control unit 10. These are for example algorithms referred to as: "virtual microphone arrangement", "forward difference prediction technique", "adaptive LMS virtual microphone technique", "Kalman filtering virtual sensing" or "stochastically optimal tonal diffuse field virtual sensing technique".

Figure 3:
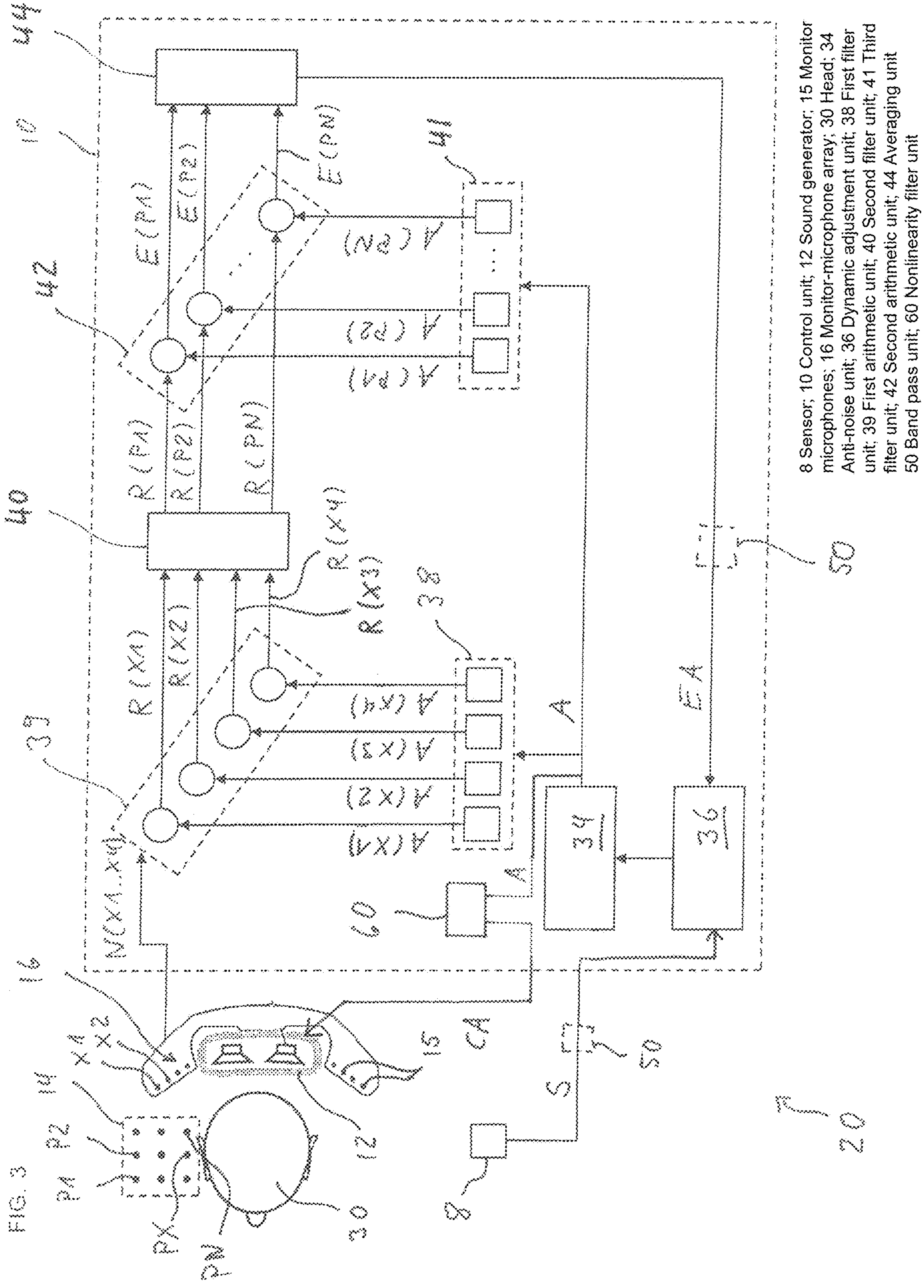

FIG. 3 is a drawing illustrating a noise reduction system 20 according to an embodiment. The system 20 comprises the sensor 8 detecting the background noise of the noise source 6. The background noise is converted to a noise signal S, which is input to a dynamic adjustment unit 36, which is configured to update parameters of an anti-noise unit 34, which in turn is configured to generate an anti-noise signal A. The anti-noise signal A is for driving the sound generator 12 in that it emits the anti-noise for superposition with the background noise of the noise source 6 in the noise reduction area 14. By way of an example only, this is illustrated in FIG. 3 and the following figures for only one ear of the passenger's head 30. Furthermore, there is a dynamic adjustment unit 36 for updating parameters of the anti-noise filter unit 34 based on an average error signal EA and so as to minimize the average error signal EA in an attempt to optimize the noise-canceling effect.

The noise reduction system 20 furthermore comprises the microphone array 16, which comprises a plurality of monitor microphones 15 each illustrated using a dot. The microphone array 16 is configured to pick up background noise and anti-noise for a plurality of virtual microphone positions P1, P2 . . . PN. The virtual microphone positions are referred to as P1, P2 . . . PN for an arbitrary number of N of virtual microphones 15. The virtual microphone positions are generally also referred to as P. They are located in the noise reduction area 14 and they can be arranged in a grid, by way of an example only.

A maximum distance between the positions P actually depends on the frequency range in which the noise-canceling algorithm operates. This frequency range can be between 50 Hz and 600 Hz. The upper limit or cutoff frequency is chosen in that a prefix of the anti-noise signal does not invert within the noise reduction area 14. This prerequisite can be advantageous for the stability of the noise-canceling algorithm. When calculating a spatial distance from this frequency, this results in a maximum spatial distance of about 0.2 m. This limit should be a maximum distance for the points P at which the virtual microphones are arranged. The same applies for a maximum distance between the point P at which the virtual microphone can be arranged, i.e. one of the aforementioned points P1 . . . PN and the physical position of the direct microphone 48, which will be explained in detail further below.

The frequency range can be set by integrating a band pass unit 50 in the signal line(s) of the either one or both of the noise signal S and the average error signal EA. The band pass unit 50 is illustrated in FIG. 3 using a dashed line so as to illustrate that it is an optional unit. It can be implemented at a same position in all other embodiments.

In FIG. 3, the control unit 10, which comprises the anti-noise unit 34 and the dynamic adjustment unit 36, further comprises an averaging unit 44, which is configured to calculate the average error signal EA. The average error signal EA is indicative of a difference between the background noise and the anti-noise at more than one position P in the noise reduction area 14. The dynamic adjustment unit 36 updates the parameters of the noise-canceling algorithm running in the anti-noise unit 34 based on and so as to minimize the average error signal EA.

The estimation of the average error signal EA reflects more than one position P in the noise reduction area 14. It can be either performed by calculating more than one error signal or by calculating an average error signal, which is indicative of a difference between the background noise and the anti-noise in a predetermined section PQ of the noise reduction area 14, wherein the section PQ comprises more than one position P. The first concept will be explained in the following by making reference to FIGS. 3 and 4, the second concept will be explained by making reference to FIGS. 5 and 6. Naturally, multiple embodiments of each respective concept are explained when making reference to the figures.

Referring back to FIG. 3, the control unit 10 further comprises a first filter unit 38, which is configured to receive the anti-noise signal A. The first filter unit 38 estimates a shifted anti-noise signal, generally referred to as A(x), which is indicative of the anti-noise at the physical position x of one of the monitor microphones 15 of the microphone array 16. By way of an example, the physical positions of the monitor microphones 15 are denoted x1 . . . x4. The corresponding shifted anti-noise signals for these positions x1 . . . x4 are A(x1), A(x2), A(x3) and A(x4). The shifted anti-noise signal A(x) represents the estimated anti-noise signal at the respective physical position of the monitor microphones 15. For the calculation of the individual signals A(x1), A(x2), A(x3) and A(x4), the first filter unit 38 can comprise respective subunits.

Furthermore, the control unit 10 comprises a first arithmetic unit 39. The first arithmetic unit 39 receives the shifted anti-noise signals A(x) and a monitor signal, generally referred to as N(x), of the monitor microphones 15 being located at the physical position x. The first arithmetic unit 39 can receive the shifted anti-noise signals A(x1), A(x2), A(x3) and A(x4) and the monitor signal N(x1 . . . x4) of the monitor microphones 15 being located at positions x1 . . . x4. The first arithmetic unit 39 is configured to calculate a residual signal, which is generally denoted R(x) and which is a difference between the monitor signal N(x) and the shifted anti-noise signal A(x) at the physical position x of the monitor microphone 15. The first arithmetic unit 39 can calculate the residual signals R(x1), R(x2), R(x3) and R(x4), which is a respective difference between A(x1) and N(x1), A(x2) and N(x2), A(x3) and N(x3) and A(x4) and N(x4). The residual signal R(x) is the residual noise at the respective position x of the monitor microphone 15, which means the noise generated by the noise source 6 minus the anti-noise signal at a respective position x.

The residual signals R(x) are input to a second filter unit 40. The second filter unit 40 is configured to estimate a shifted residual signal R(P), which is the residual signal R(x) shifted to the position P of the virtual microphone. Residual signals R(P1) . . . R(N) for a respective one of the position P1 . . . PN, such as for all the positions P in the noise reduction area 14, are calculated.

The control unit 10 further comprises a third filter unit 41, which receives the anti-noise signal A. The third filter unit 41 is configured to estimate a shifted anti-noise signal, which is generally denoted A(P) and which is indicative of the anti-noise at the position P of the virtual microphone 32. For calculation of a respective one of the shifted anti-noise signals A(P1) . . . A(PN), the third filter unit 41 can comprise respective subunits.

Furthermore, the control unit 10 comprises a second arithmetic unit 42, which receives the residual signals R(P) and the shifted anti-noise signals A(P), respectively. The second arithmetic unit 42 can receive the shifted residual signals R(P1) . . . R(PN) and the shifted anti-noise signals A(P1) . . . A(PN) for a respective one of the positions P1 . . . PN in the noise reduction area 14. The second arithmetic unit 42, from a respective one of these pairs of values, calculates or estimates an error signal, which should be generally denoted E(P), for the position P of the virtual microphone. A first error signal E(P1) can be calculated for a point P1, a second error signal E(P2) is calculated for a point P2, wherein this is continued up to the maximum number N of points P in the noise reduction area 14, which means the error signal E(PN).

All the error signals E(P1) . . . E(PN) are input to the averaging unit 44. From the error signals E(P), the averaging unit 44 calculates the average error signal EA. The average error signal EA can be the arithmetic average of all the previously mentioned error signals E(P1), E(P2) . . . E(PN). This averaging is performed at least for the first and the second position P1, P2 of the virtual microphones. The averaging unit 44 can be configured to compute the average error signal EA, which is the average of every error signal E(P1), E(P2) . . . E(PN) for all positions P1, P2 . . . PN of the virtual microphones located in the noise reduction area 14. The average error signal EA is input to the dynamic adjustment unit 36 to update parameters of the anti-noise filter unit 34, which means the updated parameters are calculated based on information about the average error signal EA and so as to minimize the average error signal EA. This leads to the effect of minimization of background noise generated by the noise source 6 in the noise reduction area 14.

The averaging unit 44 can be configured to calculate the average error signal EA from an arithmetic average of the individual error signals E(P1), E(P2) . . . E(PN). According to another embodiment, the averaging unit 44 of the noise reduction system 20 is configured to calculate the average error signal EA as a weighted average. This can be performed by giving one or more of the error signals E(P1), E(P2) . . . E(PN) an individual weight or weighting factor. When calculating this weighted average, particular emphasis can be put on a certain point P, at which a main virtual microphone is located. For example, if the head 30 of the passenger is in the position illustrated in FIG. 3, the point PX is located nearest to the ear of the passenger. Consequently, the best performance of the noise reduction should be at this particular point PX. Hence, an overweight can be placed on the error function E(PX) for the point PX and the corresponding virtual microphone. This can be performed by for example giving the error function a higher weighting factor than the remaining error functions of the other points P.

The location of the point PX, which is located nearest to the user's ear, can be performed by for example the head tracking system 26. For this purpose, the head tracking system 26 (see FIG. 2) comprises not only the camera arrangement, comprising the stereo cameras 28, but also the position detection unit 46. The position detection unit 46 is configured for detecting a position and/or orientation of the head 30 of the user in the passenger transport area 4. The control unit 10 of the noise reduction system 20 is than configured to select position PX as a main virtual microphone position, which is by way of an example only the position referred to as PX. This selection can be made out of the plurality of predetermined positions P1, P2 . . . PN of the virtual microphones in the noise reduction area 14. However, it is also possible to determine the position PX while disregarding the grid in which the remaining positions P1, P2 . . . PN are arranged. The main microphone position PX can be the position adjacent to an estimated position of an ear of the user. The averaging unit 44 is configured to overweight the error signal E(PX) of this main virtual microphone position PX when calculating the average error signal EA.

The system 20 further comprises a nonlinearity filter unit 60 having a model of the sound generator 12. There nonlinearity filter unit 60 receives the anti-noise signal A. It processes the anti-noise signal A by applying a nonlinear filter function thereon. This nonlinear filter function is based on a model of the nonlinear transfer function of the sound generator 12. By application of the nonlinear filter function on the anti-noise signal A, the nonlinear response of the sound generator number 12 can be compensated. The nonlinear filter function of the sound generator 12 can be determined for example in a practical experiment, which is performed in advance.

Compensation of nonlinear effects in sound generators 12, which can be for example one or more loudspeaker(s), is generally known from for example DE 43 34 040 A1 or DE 41 11 884 A1. Nonlinearities in electromechanical and electroacoustical transducers basically occur when large output signals are desired and the transducer is urged to operate at large amplitudes.

The nonlinearity filter unit 60 can also be placed directly behind the anti-noise unit 34 in that the filtered anti-noise signal CA is not only input to the sound generator 12 but also to the first filter unit 38 and/or third filter unit 41. By feeding the filtered anti-noise signal CA also to the third filter unit 41, the determination of the error signals E(P1), E(P2) . . . E(PN)) can also be performed based on the filtered anti-noise signal CA. This will further enhance the stability of the noise-canceling algorithm.

The embodiment in FIG. 3 relates to an embodiment, in which the control unit 10 runs a virtual sensing algorithm according to the "remote microphone technique", wherein an averaging of the error signals E(P1), E(P2) . . . E(PN)) is performed. According to further embodiments, the system 20 can dispense with the averaging of error signals E(P1), E(P2) . . . E(PN)). For example, the system 20 can be implemented having a single path. This is illustrated in the embodiment in FIG. 4.

Figure 4:
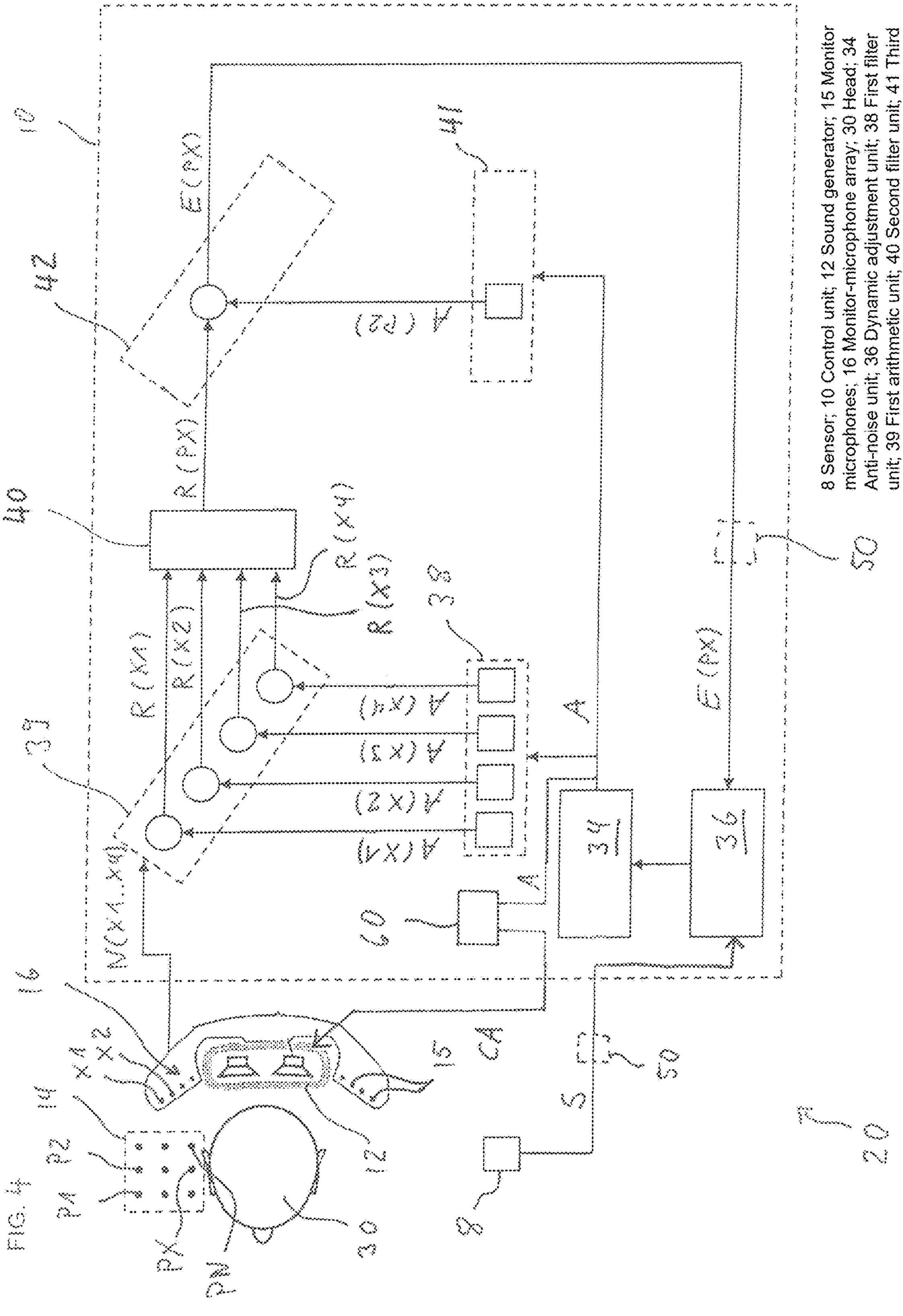

In FIG. 4, the system 20 comprises a second filter unit 40, which receives the residual signals R(x). The second filter unit 40 is configured to estimate a single shifted residual signal R(PX), which is by way of an example the residual signal R(x) shifted to the position PX. The third filter unit 41, which receives the anti-noise signal A, is configured to estimate a shifted anti-noise signal A(PX) which is indicative of the anti-noise at the position PX. The second arithmetic unit 42, which receives the residual signal R(PX) and the shifted anti-noise signal A(PX), respectively, calculates or estimates the error signal E(PX) for the position PX of the virtual microphone. The system 20, unlike the other embodiments, dispenses with the averaging unit 44. The error signal E(PX) is feed back to the dynamic adjustment unit 36. The system 20 also comprises a nonlinearity filter unit 60 having a model of the sound generator 12. There nonlinearity filter unit 60 receives the anti-noise signal A and processes the anti-noise signal A by applying the nonlinear filter function thereon, which is based on a model of the nonlinear transfer function of the sound generator 12.

Figure 5:
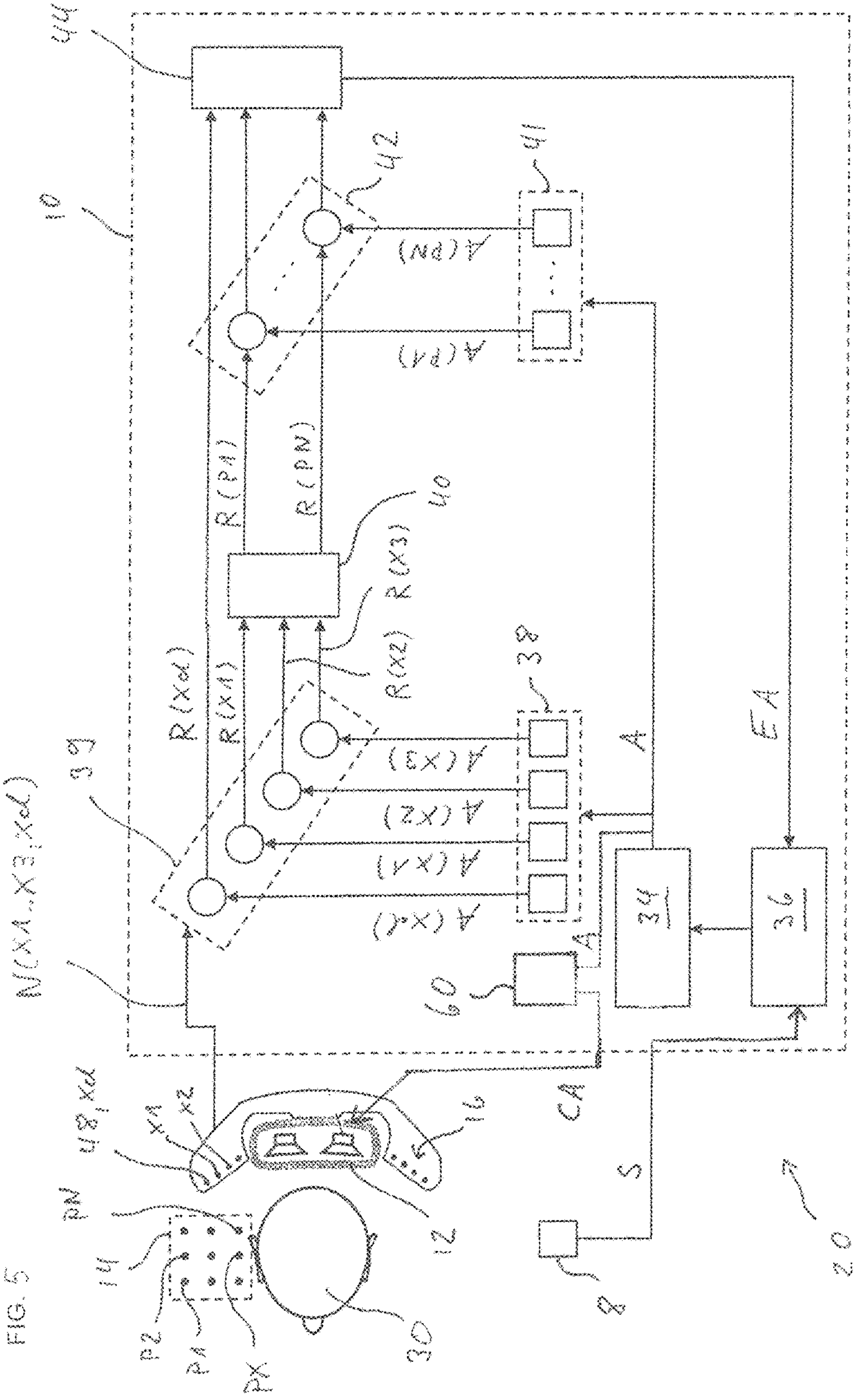

There is a further embodiment of the noise reduction system 20, which is illustrated in FIG. 5. This system 20 comprises a microphone array 16 having a direct microphone 48. The parts and units of the system 20 having the same reference numerals have already been explained when making reference to FIG. 3. The arrangement and functionality of the units is similar. Unlike the system in FIG. 3, the averaging unit 44 is configured to calculate the average error signal EA by further taking into account a direct residual signal R(xd) of the direct microphone 48.

The first filter unit 38 can be configured to estimate a shifted direct anti-noise signal A(xd). This signal A(xd) is indicative of the anti-noise at the physical position xd of the direct monitor microphone 48. Furthermore, the first arithmetic unit 39 is configured to receive the shifted direct anti-noise signal A(xd) and direct monitor signal N(xd) of the direct monitor microphone 48. The unit calculates a direct residual signal R(xd) from the difference of the direct monitor signal N(xd) and the shifted direct anti-noise signal A(xd), for the position xd of the direct monitor microphone 48. The second filter unit 40 and the second arithmetic unit 42 bypass the direct residual signal R(xd). The averaging unit 44 calculates the average error signal EA from the average of the error signals R(P1) . . . R(PN) for the positions P1 . . . PN in the noise reduction area 14 by further taking into account the direct residual signal R(xd). By further taking into account the direct residual signal R(xd), the stability of the noise-canceling in the noise reduction area 14 is enhanced.

Also this system 20 comprises a nonlinearity filter unit 60 for compensating for the nonlinear response of the sound generator 12. Compensation of the nonlinear effects in sound generators 12, for example of a loudspeaker, is in principle known from DE 43 34 040 A1 or DE 41 11 884 A1. Such compensation can be implemented in the nonlinearity filter unit 60—this can apply to all embodiments.

Figure 6:
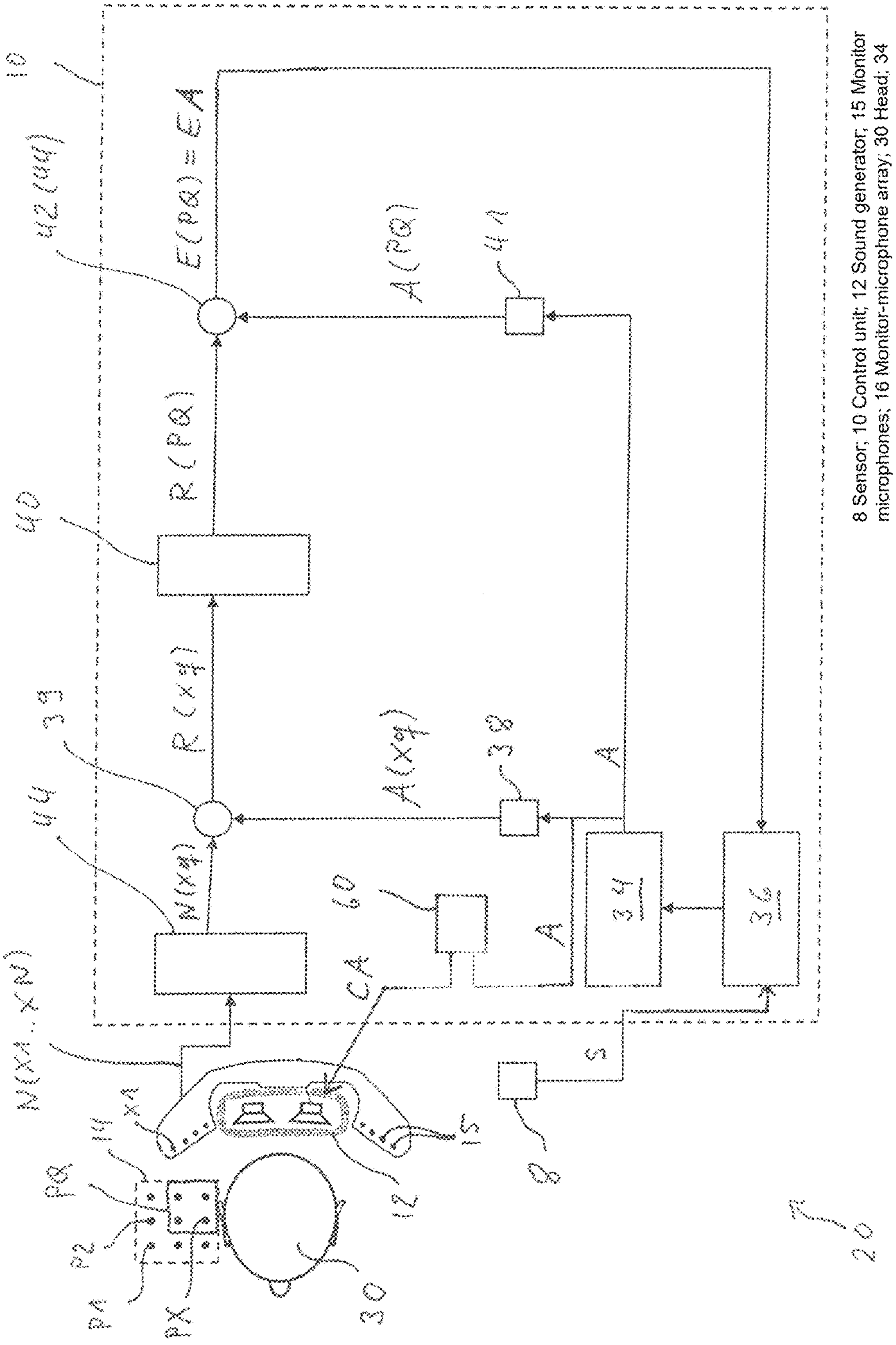

FIG. 6 shows a noise reduction system 20 according to a further embodiment. Units of this embodiment having the same reference numerals as in FIGS. 3 to 5 are not repeatedly explained. The control unit 10 comprises an averaging unit 44, which is unlikely the before explained embodiments configured to receive a plurality of monitor signals N(X) of the monitor microphones 15 being located at different physical positions x and to estimate an area monitor signal N(xq). This area monitor signal N(xq) is indicative of an error signal captured by the monitor microphones 15 for a predetermined area xq of the monitor microphones 15. The first filter unit 38 is configured to receive the anti-noise signal A and to estimate a shifted area anti-noise signal A(xq). This signal is indicative of the anti-noise in the predetermined area xq. The first arithmetic unit 39 receives the shifted area anti-noise signal A(xq) and the area monitor signal N(xq). The first arithmetic unit 39 calculates an area residual signal R(xq), which is the difference between the area monitor signal N(xq) and the shifted area anti-noise signal A(xq). The second filter unit 40 receives the area residual signal R(xq) and estimates a shifted area residual signal R(PQ). The shifted area residual signal R(PQ) is the area residual signal R(xq) shifted to a predetermined virtual area PQ, which comprises more than one position P of the virtual microphones 32. The predetermined virtual area PQ is exemplarily illustrated as a subarea or section of the noise reduction area 14.

The third filter unit 41 receives the anti-noise signal A and estimates a shifted area anti-noise signal A(PQ), which is indicative of the anti-noise in the predetermined virtual area PQ. The averaging unit 44 further comprises the second arithmetic unit 42, which is configured to receive the shifted area residual signal R(PQ) and the shifted area anti-noise signal A(PQ). The second arithmetic unit 42 further estimates the error signal E(PQ) for the predetermined virtual area PQ as the average error signal EA. The average error signal EA is again feedback to the dynamic adjustment unit 36 so as allow this unit to adapt or optimize the parameters of the anti-noise unit 34.

The concept of the area calculation of the monitor signal N, the residual signal R and the anti-noise signal A can also be supplemented by further taking into account the signal of a direct microphone 48. This will be explained by making reference to the embodiment in FIG. 7.

Figure 7:
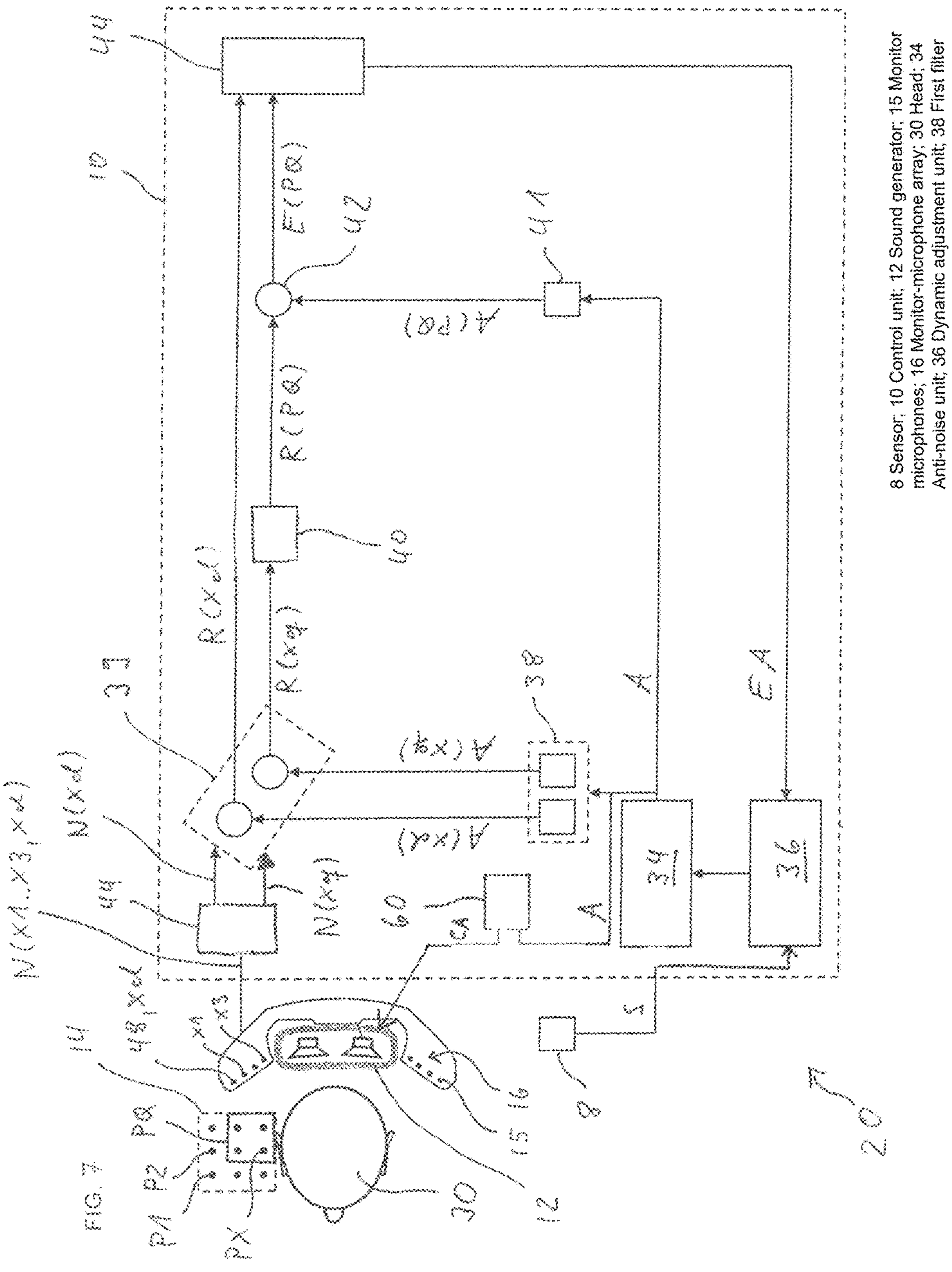

Units of the embodiment shown in FIG. 7, which are given the same reference numerals as in FIG. 5 will not be explained repeatedly. Unlike the embodiment in FIG. 5, the averaging unit 44 receives the monitor signals from the monitor microphones 15 being located at the positions x1 . . . x3 and of the direct monitor microphone 48. One of the monitor microphones 15 can be selected as the direct microphone 48, which should be located at position xd. Hence, the direct monitor signal N comprises signals of the monitor microphones 15 forming the monitor-microphone array 16 and in addition to this the signal of the direct microphone 48 being located at position xd, the signal is referred to as N(x1 . . . x3, xd).

The averaging unit 44 calculates from this signal the area monitor signal N(xq), wherein the signals of the monitor microphones 15 being located for example at positions x1 . . . x3 are taken into account. Furthermore, the averaging unit 44 forwards the direct monitor signal N(xd) to the first arithmetic unit 39. At the first arithmetic unit 39, as already explained with reference to the embodiment shown in FIG. 5, a difference between the area monitor signal N(xq) and the shifted area anti-noise signal A(xq) is calculated and further processed as the area residual signal R(xq) by the second filter unit 40. The further operation of the third filter unit 41 and the second differential unit 42 is similar to the embodiment in FIG. 6. Unlike this embodiment, the first arithmetic unit 39 is further configured to calculate a direct residual signal R(xd) from a difference of the direct monitor signal N(xd) and the shifted direct anti-noise signal A(xd). This direct residual signal R(xd) bypasses the second filter unit 40 and the second differential unit 42 and is directly input into the averaging unit 44. The averaging unit 44 is configured to calculate the average error signal EA, which is an average of the error signal for the predetermined virtual area E(PQ) and the direct residual signal R(xd).

The systems shown in FIGS. 4 to 7 are also equipped with a nonlinearity filter unit 60. By way of an example only, this is placed between the anti-noise unit 34 and the sound generator 12. According to another embodiments, the nonlinearity filter unit 60 is placed directly behind the anti-noise unit 34 in that not only the sound generator 12 but also the first filter unit 38 and/or the third filter unit 41 is supplied with the filtered anti-noise signal CA.

The various units described as part of the control unit 10 in FIGS. 3-7 can be implemented as a single controller configured to perform each of the functions of the various units therein or as separate controllers or computing modules within the control unit 10 and can each be configured as dedicated hardware circuits or software implemented on hardware controllers/computing modules.

Table of Reference Signs

| | |
|---|---|
| 2 | vehicle |
| 4 | passenger transport area |
| 6 | noise source |
| 8 | reference sensor |
| 10 | control unit |
| 12 | sound generator |
| 14 | noise reduction area |
| 14a | left noise reduction area |
| 14b | right noise reduction area |
| 15 | monitor microphone |
| 16 | monitor-microphone array |
| 20 | noise reduction system |
| 22 | seat |

-continued

| Table of Reference Signs | |
|---|---|
| 24 | headrest |
| 26 | head tracking system |
| 28 | stereo cameras |
| 30 | head |
| 32 | virtual microphone |
| 34 | anti-noise unit |
| 36 | dynamic adjustment unit |
| 38 | first filter unit |
| 39 | first arithmetic unit |
| 40 | second filter unit |
| 41 | third filter unit |
| 42 | second arithmetic unit |
| 44 | averaging unit |
| 46 | position detection unit |
| 48 | direct monitor microphone |
| 50 | band pass unit |
| 60 | nonlinearity filter unit |
| S | noise signal |
| A | anti-noise signal |
| CA | filtered anti-noise signal |
| N | monitor signal |
| R | residual signal |
| E | error signal |
| P | virtual microphone position |
| PQ | predetermined virtual area |
| EA | average error signal |
| PX | main virtual microphone position |
| ED | direct error signal |
| x | physical microphone position |
| xq | predetermined area |
| A(x) | shifted anti-noise signal |
| A(xd) | shifted direct anti-noise signal |
| A(xq) | shifted area anti-noise signal |
| N(x) | monitor signal |
| N(xd) | direct monitor signal |
| N(xq) | area monitor signal |
| R(x) | residual signal |
| R(xd) | direct residual signal |
| R(xq) | area residual signal |
| R(P) | shifted residual signal |
| R(PQ) | shifted area residual signal |
| A(P) | shifted anti-noise signal |
| A(Pq) | shifted area anti-noise signal |
| E(P) | error signal for point P |
| E(PQ) | error signal for the virtual area PQ |

The invention claimed is:

1. A noise reduction system for actively compensating background noise generated by a noise source in a noise reduction area in a passenger transport area of a vehicle, the noise reduction system comprising:

a controller comprising hardware;

a reference sensor configured to detect the background noise generated by the noise source;

a sound generator configured to generate anti-noise for superimposing the anti-noise with the background noise in the noise reduction area for active reduction of the background noise; and a monitor-microphone array comprising a plurality of monitor microphones, the monitor-microphone array being disposed adjacent to the noise reduction area and being configured to pick up the background noise generated by the noise source and the anti-noise generated by the sound generator;

wherein the controller is configured by a virtual sensing algorithm to estimate an error signal at a position of a virtual microphone, wherein the virtual microphone is located in the noise reduction area and the error signal is indicative of a summation between the background noise and the anti-noise at the position of the virtual microphone, wherein the controller is configured to:

generate an anti-noise signal for driving the sound generator to generate the anti-noise;

generate a corrected anti-noise signal by applying a nonlinear filter function on the anti-noise signal, which is based on a model of a non-linear transfer function of the sound generator in that a non-linear response of the sound generator is at least partially corrected when driven by the corrected anti-noise signal; and output the corrected anti-noise signal to the sound generator, and wherein the sound generator is an electromechanical device and the model of the non-linear transfer function is an adaptive model configured to adapt on a change in at least one mechanical parameter of the sound generator.

2. The noise reduction system according to claim 1, wherein the controller is further configured to:

calculate an average error signal, which is indicative of a summation between the background noise and the anti-noise at more than one position in the noise reduction area; and update parameters of the controller based on the average error signal so as to minimize the average error signal.

3. The noise reduction system according to claim 2, wherein the controller is further configured to calculate the average error signal, which is a weighted average of at least first and second error signals.

4. The noise reduction system according to claim 3, wherein the controller is further configured to:

detect a position and/or orientation of a head and estimate a position of an ear of a user in the passenger transport area;

select a main position of the more than one position, which is adjacent to the position of the ear of the user; and overweight the error signal at the main position when calculating the average error signal.

5. The noise reduction system according to claim 2, wherein the controller is configured to:

estimate a shifted anti-noise signal, which is indicative of the anti-noise at a physical position of one of the plurality of monitor microphones of the monitor-microphone array;

calculate a residual signal, which is a difference between a monitor signal of the one of the plurality of monitor microphones and the shifted anti-noise signal at the physical position of the one of the plurality of monitor microphones;

estimate a shifted residual signal, which is the residual signal shifted to the position of the virtual microphone;

estimate a shifted anti-noise signal, which is indicative of the anti-noise at the position of the virtual microphone; and estimate the error signal for the position of the virtual microphone by addition of the shifted residual signal and the shifted anti-noise signal.

6. The noise reduction system according to claim 2, wherein the monitor-microphone array further comprises a direct monitor microphone, and wherein the controller is configured to calculate the average error signal, by further taking into account a direct residual signal of the direct monitor microphone.

7. The noise reduction system according to claim 2, wherein the controller is further configured to apply a band pass filter on the average error signal and/or on a noise signal converted from the background noise detected by the reference sensor.

8. The noise reduction system according to claim 1, wherein the controller is configured to:

calculate an average error signal, which is indicative of a summation between the background noise and the anti-noise in a predetermined area of the noise reduction area comprising more than one position; and update parameters of the controller based on the average error signal so as to minimize the average error signal.

9. A method of operating a noise reduction system for actively compensating background noise generated by a noise source in a noise reduction area in a passenger transport area of a vehicle, the noise reduction system comprising a controller comprising hardware, a reference sensor configured to detect the background noise generated by the noise source, a sound generator configured to generate anti-noise for superimposing the anti-noise with the background noise in the noise reduction area for active reduction of the background noise, and a monitor-microphone array comprising a plurality of monitor microphones, the monitor-microphone array being disposed adjacent to the noise reduction area and being configured to pick up the background noise emitted generated by the noise source and the anti-noise generated by the sound generator, wherein the controller is configured by a virtual sensing algorithm to estimate an error signal at a position of a virtual microphone, and wherein the virtual microphone is located in the noise reduction area and the error signal is indicative of a summation between the background noise and the anti-noise at the position of the virtual microphone, the method comprising:

generating, by the noise reduction system, an anti-noise signal for driving the sound generator to generate the anti-noise;

generating a corrected anti-noise signal by applying a non-linear filter function on the anti-noise signal, which is based on a model of a non-linear transfer function of the sound generator in that a non-linear response of the sound generator is at least partially corrected when driven by the corrected anti-noise signal; and outputting the corrected anti-noise signal to the sound generator, wherein the sound generator is an electromechanical device and the model of the non-linear transfer function is an adaptive model which adapts on a change in at least one mechanical parameter of the sound generator.

10. The method according to claim 9, wherein the method further comprises:

calculating an average error signal, which is indicative of a summation between the background noise and the anti-noise at more than one position in the noise reduction area; and updating parameters of the controller based on the average error signal so as to minimize the average error signal.

11. The method according to claim 10, wherein the method further comprises calculating the average error signal, which is a weighted average of at least first and second error signals.

12. The method according to claim 11, further comprising:

detecting a position and/or orientation of a head and estimating a position of an ear of a user in the passenger transport area;

selecting a main position of the more than one position, which is adjacent to the position of the ear of the user; and giving an overweight to the error signal at the main position when calculating the average error signal.

13. The method according to one of claim 10, wherein the method further comprises:

estimating a shifted anti-noise signal, which is indicative of the anti-noise at a physical position of one of the plurality of monitor microphones of the monitor-microphone array;

calculating a residual signal, which is a difference between a monitor signal of the one of the plurality of monitor microphones and the shifted anti-noise signal at the physical position of the one of the plurality of monitor microphones;

estimating a shifted residual signal, which is the residual signal shifted to the position of the virtual microphone;

estimating a shifted anti-noise signal, which is indicative of the anti-noise at the position of the virtual microphone; and estimating the error signal for the position of the virtual microphone by adding the shifted residual signal and the shifted anti-noise signal.

14. The method according to claim 10, wherein the monitor-microphone array further comprises a direct monitor microphone, and wherein the method further comprises calculating the average error signal, by further taking into account a direct residual signal of the direct monitor microphone.

15. The method according to claim 10, wherein the method further comprises applying a band pass filter on the average error signal and/or on a noise signal picked up by the reference sensor for detecting the background noise of the noise source.

16. The method according to claim 9, wherein the method further comprises:

calculating an average error signal, which is indicative of a summation between the background noise and the anti-noise in a predetermined area of the noise reduction area comprising more than one position; and updating parameters of the controller based on the average error signal so as to minimize the average error signal.

17. A processing apparatus for actively compensating background noise generated by a noise source in a noise reduction area in a passenger transport area of a vehicle, the processing apparatus comprising:

a controller comprising hardware, the controller being configured by a virtual sensing algorithm to estimate an error signal at a position of a virtual microphone, wherein the virtual microphone is located in the noise reduction area and the error signal is indicative of a summation between background noise generated by the noise source as detected by a reference sensor and anti-noise generated by a sound generator for superimposing the anti-noise with the background noise at the position of the virtual microphone for active reduction of the background noise;

wherein the controller is configured to:

generate an anti-noise signal for driving the sound generator to generate the anti-noise;

generate a corrected anti-noise signal by applying a nonlinear filter function on the anti-noise signal, which is based on a model of a non-linear transfer function of the sound generator in that a non-linear response of the sound generator is at least partially corrected when driven by the corrected anti-noise signal; and output the corrected anti-noise signal to the sound generator, and wherein the sound generator is an electromechanical device and the model of the non-linear transfer function is an adaptive model configured to adapt on a change in at least one mechanical parameter of the sound generator.

* * * * *